United States Patent
Bernasconi

(10) Patent No.: US 10,001,296 B2
(45) Date of Patent: Jun. 19, 2018

(54) CONDENSATE NEUTRILIZER ADAPTER CAP

(71) Applicant: Michael C. Bernasconi, Quincy, MA (US)

(72) Inventor: Michael C. Bernasconi, Quincy, MA (US)

( * ) Notice: Subject to any disclaimer, the term of this patent is extended or adjusted under 35 U.S.C. 154(b) by 71 days.

(21) Appl. No.: 15/204,260

(22) Filed: Jul. 7, 2016

(65) Prior Publication Data

US 2017/0010020 A1     Jan. 12, 2017

Related U.S. Application Data

(60) Provisional application No. 62/190,365, filed on Jul. 9, 2015.

(51) Int. Cl.
    *F24H 8/00*        (2006.01)

(52) U.S. Cl.
    CPC ............ *F24H 8/006* (2013.01); *Y02B 30/106* (2013.01)

(58) Field of Classification Search
CPC ... F24H 8/006; F24H 8/00; F24H 9/02; F24H 9/12; F24H 9/144; F24H 9/16; Y02B 30/106; B01D 2201/301; F28F 9/0246
See application file for complete search history.

(56) References Cited

U.S. PATENT DOCUMENTS

| | | | | |
|---|---|---|---|---|
| 3,916,130 A * | 10/1975 | Cade | ................. | H01H 35/2671 200/51 R |
| 4,309,947 A * | 1/1982 | Ketterer | .................. | F24H 8/006 110/203 |
| 4,520,950 A * | 6/1985 | Jeans | ................... | B67D 1/0021 137/212 |
| 4,773,474 A * | 9/1988 | Stay | ...................... | F28F 9/0231 165/178 |
| 4,780,197 A * | 10/1988 | Schuman | ............... | B01D 29/21 210/136 |
| 6,733,045 B2 * | 5/2004 | Harrington | ........... | F16L 37/252 285/143.1 |
| 9,267,705 B2 * | 2/2016 | Walker | .................... | F24H 9/124 |
| 9,314,758 B2 * | 4/2016 | Chauvin | ................ | B01J 8/0257 |
| 2008/0099414 A1 * | 5/2008 | Haslem | ............. | B01D 17/0214 210/800 |
| 2011/0226868 A1 * | 9/2011 | Modlin | ................. | A01M 1/205 239/102.1 |

* cited by examiner

*Primary Examiner* — Gregory A Wilson
(74) *Attorney, Agent, or Firm* — Dunlap Bennett & Ludwig PLLC

(57) ABSTRACT

A condensate neutralizer having cap adapters is provided. The condensate neutralizer includes a captive pipe, a first cap adapter and a second cap adapter. Each of the cap adapters includes a base, a lock ring and a cap. The base includes a bottom portion secured to the captive pipe and a top portion forming a base opening. The lock ring forms a lock ring opening and releasably attaches to the top portion of the base. The cap includes a plate and an inlet protruding from the plate. The inlet is connectable to a pipe. The plate includes a diameter larger than the base opening and the lock ring opening and is disposed in between the base and the lock ring.

4 Claims, 4 Drawing Sheets

CONDENSATE NEUTRILIZER ADAPTER CAP

CROSS-REFERENCE TO RELATED APPLICATION

This application claims the benefit of priority of U.S. provisional application No. 62/190,365, filed Jul. 9, 2015, the contents of which are herein incorporated by reference.

BACKGROUND OF THE INVENTION

The present invention relates to an easy to service condensate neutralizer.

Condensing boilers are water heaters fueled by gas or oil. They achieve high efficiency (typically greater than 90% on the higher heating value) by using waste heat in flue gases to pre-heat cold water entering the boiler. Water vapor produced during combustion is condensed into liquid form, which leaves the system via a drain.

The condensate expelled from a condensing boiler is acidic, with a pH between 2 and 4. Condensing boilers require a drainpipe for the condensate produced during operation. This consists of a short length of polymer pipe with a vapor trap to prevent exhaust gases from being expelled into the building. The acidic nature of the condensate may be corrosive to cast iron plumbing, waste pipes and concrete floors but poses no health risk to occupants. A neutralizer, typically consisting of a plastic container filled with marble or limestone aggregate or "chips" (alkaline) can be installed to raise the pH to acceptable levels. Currently, to service and recharge condensate neutralizers the piping must be disturbed.

As can be seen, there is a need for a device that allows users to service and recharge the condensate neutralizers without disturbing the piping.

SUMMARY OF THE INVENTION

In one aspect of the present invention, a condensate neutralizer comprises: a captive pipe comprising a first end comprising a first rim forming a first opening and a second end comprising a second rim forming a second opening; a first cap adapter secured to the first end and a second cap adapter secured to the second end, wherein each of the first and second cap adapter comprises: a base comprising a bottom portion secured to the captive pipe and a top portion forming a base opening; a lock ring forming a lock ring opening, wherein the lock ring is releasably attached to the top portion of the base; and a cap comprising a plate and an inlet protruding from the plate, wherein the inlet is connectable to a pipe, and the plate comprises a diameter larger than the base opening and the lock ring opening, wherein the plate is disposed in between the base and the lock ring.

In another aspect of the present invention, an adapter cap comprises: a base comprising a bottom portion securable to a captive pipe of a condensate neutralizer and a top portion comprising male threads and forming a base opening; a lock ring forming a lock ring opening and comprising internal female threads releasably attached to the male threads of the top portion of the base; a cap comprising a plate and an inlet protruding from the plate, wherein the inlet is connectable to a pipe, and the plate comprises a diameter larger the base opening and the lock ring opening, and the plate is disposed in between the base and the lock ring; and a gasket disposed in between the cap and the base.

These and other features, aspects and advantages of the present invention will become better understood with reference to the following drawings, description and claims.

DETAILED DESCRIPTION OF THE INVENTION

Figure 2:
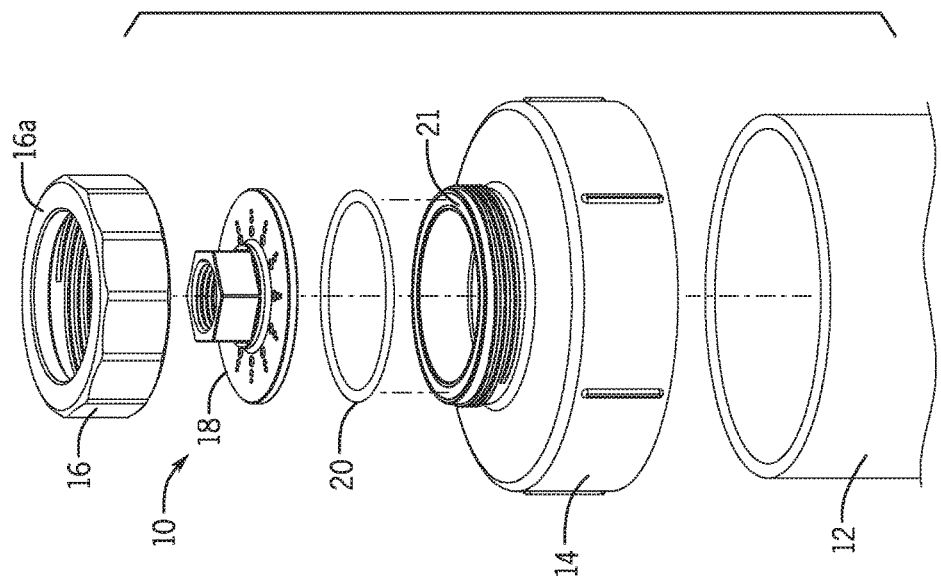
FIG. 2 is an exploded perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a body of a condensate neutralizer with built in unions and O ring seals at each end. This allows removing from the system to service without moving or disturbing any part of the piping system. The O ring groove may be contained within the main body so that the end plate does not have to move. The body can then be emptied and cleaned, and then reinstalled.

The end caps may be glued to the captive pipe, such as a PVC piping. The O ring is then installed in a groove on each of the end cap. A plate with a boss is placed against the O ring and the locking ring is threaded onto the cap and tightened to form a seal. Once the unit is assembled at the factory all that is needed is to install fittings into the boss female threads and install into a drain line. The present invention is installed in the condensate drain of a gas fired condensing appliance. When it is time to service the lock rings are unthreaded and the main body is pulled out, emptied, cleaned and filled with new media, slid back in and the lock rings are tightened.

Referring to FIGS. 1 through 7, the present invention may include a condensate neutralizer. The condensate neutralizer includes a captive pipe 12, a first cap adapter 10 and a second cap adapter. Each of the cap adapters 10 includes a base 14, a lock ring 16 and a cap 18. The base 14 includes a bottom portion secured to the captive pipe 12 and a top portion forming a base opening. The lock ring 16 forms a lock ring opening and releasably attaches to the top portion of the base 14. The lock ring 16 further includes an upper flange 16a protruding inwardly into to the lock ring opening. The cap 18 includes a plate and an inlet protruding from the plate. The inlet is connectable to a pipe. The plate is disposed within the lock ring 16 in between the base 14 and the upper flange 16a.

The captive pipe 12 of the present invention may include an elongated tube, such as a PVC pipe, having the top rim and the bottom rim. The captive pipe 12 is filled with marble or limestone aggregate or "chips" (alkaline). The chips occasionally need to be exchanged. Using the present invention, the user may detach the lock ring 16 from the base 14, which allows the user to remove the captive pipe 12 from the piping. The user may then empty the chips from the captive pipe 12, clean the captive pipe 12 and place new chips into the captive pipe 12.

Figure 1:
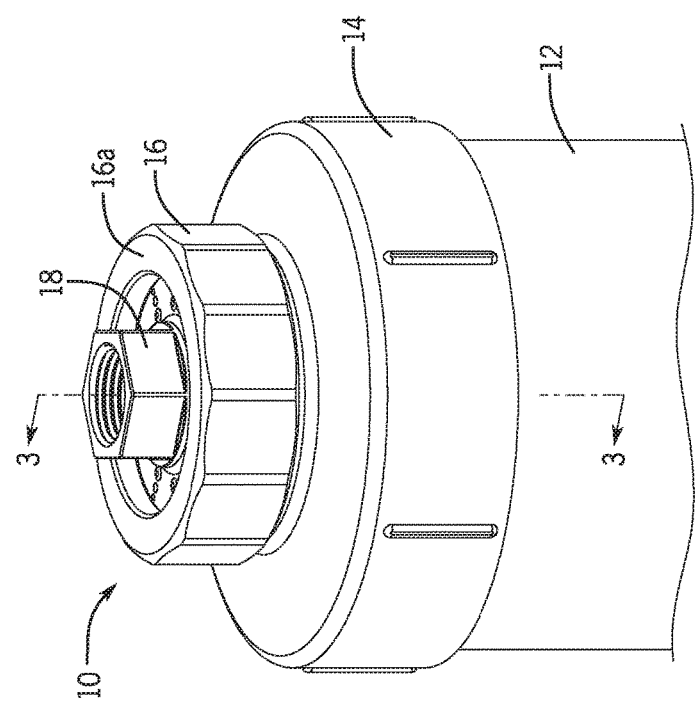
FIG. 1 is a perspective view of an embodiment of the present invention.
Figure 3:
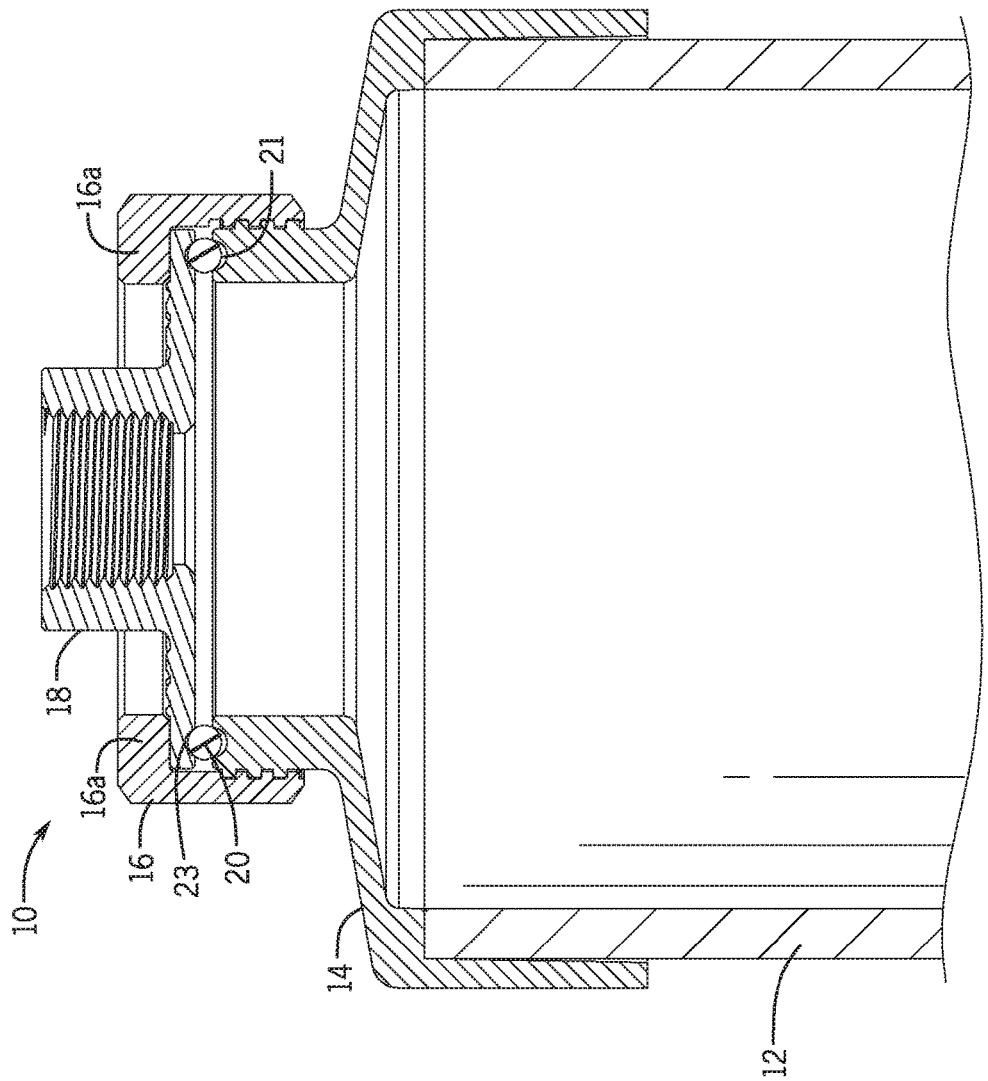
FIG. 3 is a cross-sectional view taken along line 3-3 in FIG. 1.
Figure 5:
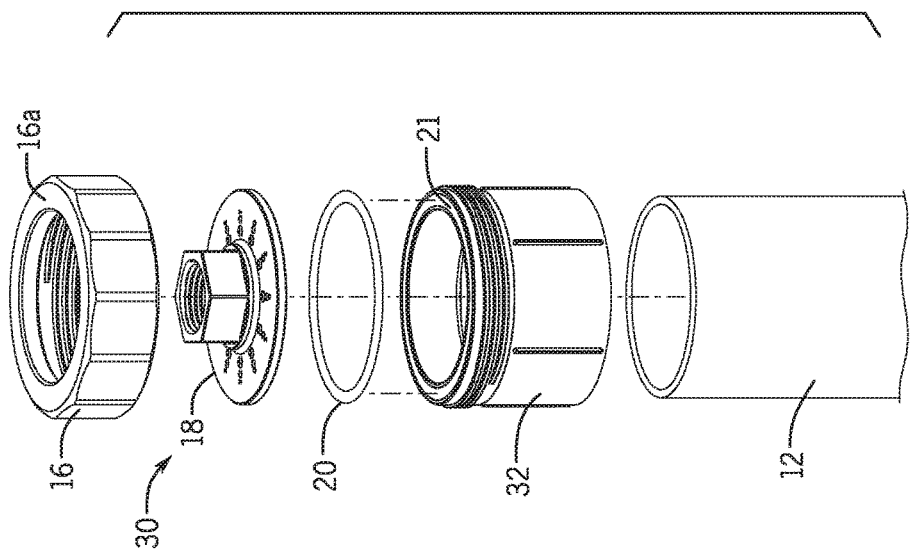
FIG. 5 is an exploded perspective view of an embodiment of the present invention.
Figure 4:
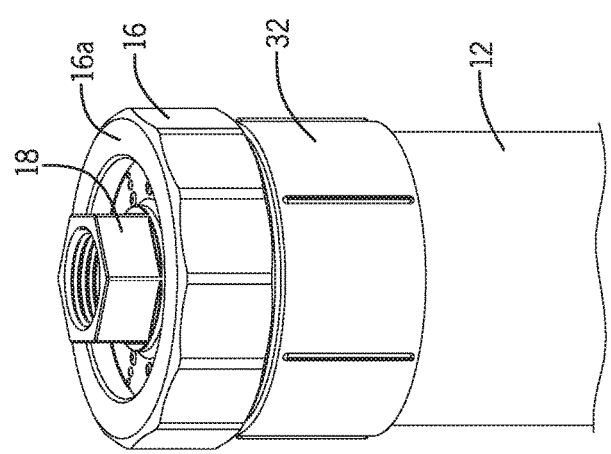
FIG. 4 is a perspective view of an embodiment of the present invention.
Figure 7:
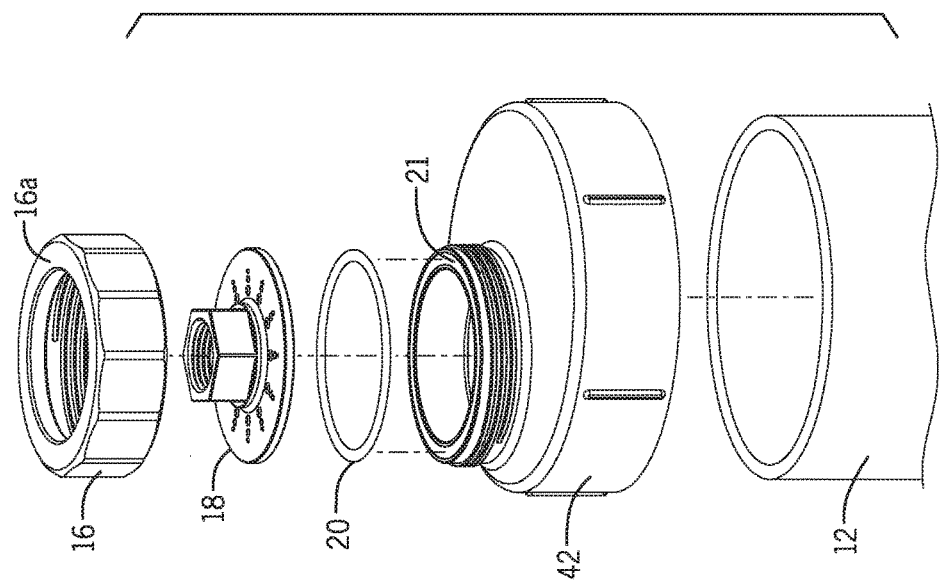
FIG. 7 is an exploded perspective view of an embodiment of the present invention.
Figure 6:
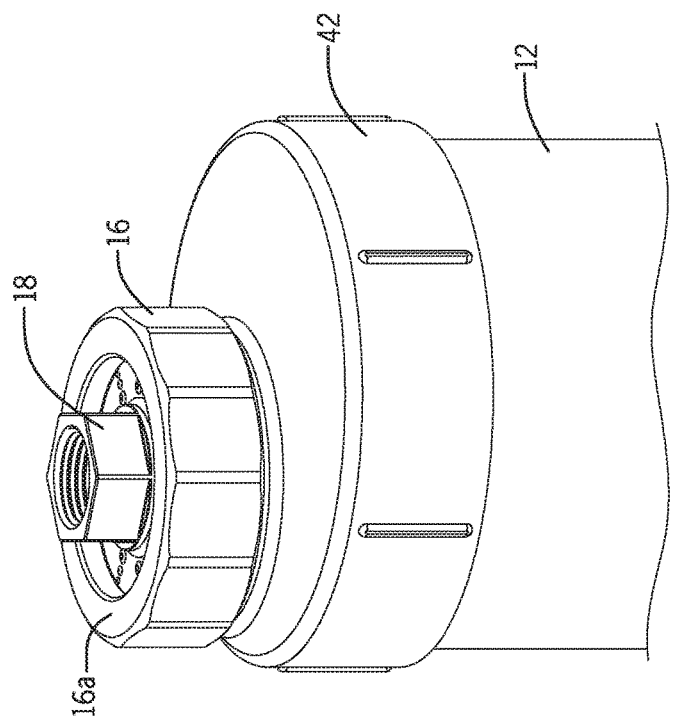
FIG. 6 is a perspective view of an embodiment of the present invention.

The bottom portion of the base 14 of the present invention may include a circular shaped sidewall that is sealed around the rim of the captive pipe 12. As illustrated in FIGS. 1 and 2, the top portion may extend from a central portion of the bottom portion. The top portion may include a protruding ring having male threads along an outer sidewall. As illustrated in FIGS. 4 and 5, the top portion of the base 32 may extend from and substantially have the same diameter as the circular shaped sidewall. As illustrated in FIGS. 6 and 7, the top portion of the base 42 may extend from an offset portion of the bottom portion.

The lock ring 16 of the present invention may include a ring shaped body having an internal sidewall. The internal sidewall may include female threads releasably attachable to the male threads of the base 14. In alternate embodiments, the base 14 may include the female threads and the lock ring 16 may include the male threads.

As mentioned above, the cap 18 includes a plate and an inlet protruding from the plate 18. The inlet may protrude from an upper surface of the plate 18 and may be disposed in between and extending beyond the lock ring opening. The inlet may include a hexagon shape and may rotate relative to the plate. The inlet may further include internal female threading. Therefore, the inlet may be connected to a pipe by screwing or rotating the inlet onto male threads of the pipe.

The present invention may further include a gasket 20. The gasket 20 may include an O-ring formed of a rubber or rubber like material. The gasket 20 may prevent the adapter cap 10 connection from leaking. In certain embodiments, a first groove 21 may be formed circumferentially about a top edge of the top portion of the base 14. Further, a second groove 23 may be formed circumferentially about a lower surface of the cap 18. The gasket 20 may be disposed within the first groove 21 and the second groove 23, and may thereby be sandwiched in between the cap 18 and the base 14.

To use the present invention, the first and second cap adapters 10 are secured to opposing ends of the captive pipe 12. The inlets of each of the first and second cap adapters 10 are screwed onto a drain line pipe. When the chips within the captive pipe 12 need to be changed, the user may unscrew the lock ring 16 from the base 14 on both the first and second cap adapters 10. The user may then remove the captive pipe 12 and empty the chips from the captive pipe 12, clean the captive pipe 12 and place new chips into the captive pipe 12. The user may then screw the lock rings 16 back onto the base 14 of both the first and second cap adapters 10. Using the above described method and apparatus, the user does not need to disturb the drain line piping when removing the condensate neutralizer.

It should be understood, of course, that the foregoing relates to exemplary embodiments of the invention and that modifications may be made without departing from the spirit and scope of the invention as set forth in the following claims.

What is claimed is:

1. An adapter cap comprising:
    a base comprising a bottom portion and a top portion, wherein the bottom portion is configured to secure to a captive pipe of a condensate neutralizer and the top portion defines a base opening and comprises a first groove formed along a top edge and male threads;
    a lock ring defining a lock ring opening, the lock ring comprising an upper flange protruding inwardly and internal female threads releasably attached to the male threads of the top portion of the base;
    a cap comprising a plate and an inlet protruding from the plate, wherein the inlet is configured to connect to a pipe, and the plate is disposed within the lock ring and in between the base and the upper flange; and
    an O-ring gasket disposed within the first groove in between the cap and the base.

2. The adapter cap of claim 1, wherein the first groove is formed circumferentially about the top edge.

3. The adapter cap of claim 1, wherein a bottom surface of the plate of the cap comprises a second groove, wherein the O-ring is disposed in between the first groove and the second groove.

4. The adapter cap of claim 1, wherein the inlet of the cap comprises internal female threads.

* * * * *